US010805673B2

(12) United States Patent
Lee et al.

(10) Patent No.: US 10,805,673 B2
(45) Date of Patent: *Oct. 13, 2020

(54) METHOD AND SYSTEM FOR DETECTING AND RESPONDING TO CHANGING OF MEDIA CHANNEL

(71) Applicant: Gracenote, Inc., Emeryville, CA (US)

(72) Inventors: Jaehyung Lee, Seoul (KR); Dewey Ho Lee, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,179

(22) Filed: Dec. 5, 2019

(65) Prior Publication Data

US 2020/0149290 A1 May 14, 2020

Related U.S. Application Data

(63) Continuation of application No. 16/015,827, filed on Jun. 22, 2018, now Pat. No. 10,531,150, which is a
(Continued)

(51) Int. Cl.
*H04H 60/32* (2008.01)
*H04N 21/44* (2011.01)
(Continued)

(52) U.S. Cl.
CPC .......... *H04N 21/44008* (2013.01); *C09J 7/20* (2018.01); *E04F 13/0887* (2013.01);
(Continued)

(58) Field of Classification Search
CPC ....... H04N 21/44008; H04N 21/23109; H04N 21/8352; H04N 21/6582; H04N 21/8456;
(Continued)

(56) References Cited

U.S. PATENT DOCUMENTS 7,461,392 B2   12/2008 Herley
7,653,921 B2 *  1/2010 Herley .................... H04N 7/16
                                            725/19
(Continued)

FOREIGN PATENT DOCUMENTS

CN   102176208    9/2011
CN   103533459    1/2014
(Continued)

OTHER PUBLICATIONS

US 9,189,826 B1, 11/2015, Sharifi et al. (withdrawn)
(Continued)

*Primary Examiner* — Michael B. Pierorazio
(74) *Attorney, Agent, or Firm* — McDonnell Boehnen Hulbert & Berghoff LLP

(57) ABSTRACT

A computing system receives from a media presentation device a query fingerprint stream representing media content being presented by the media presentation device, where the query fingerprint stream has been determined to represent a first channel. The computing system then detects that a threshold mismatch exists between the received query fingerprint stream and a reference fingerprint stream representing the first channel, thus indicating a likelihood that the media presentation device has transitioned from presenting the first channel to presenting a second channel. Responsive to detecting the threshold mismatch, the system thus discontinues channel-specific action with respect to the first channel. For instance, the system could discontinue superimposing of first-channel-specific content on the presented media content and perhaps start superimposing of second-channel-specific content instead.

19 Claims, 8 Drawing Sheets

Reference: Server

Match start / first channel start — Match

Expected reference frames match with the query sent from TV: Low transition likelihood ⟶ No match No match Predicted reference frame differs with query: High transition likelihood, first channel stop Channel change screen TV shows content, matched with DB Query: TV

Related U.S. Application Data continuation of application No. 15/443,615, filed on Feb. 27, 2017, now Pat. No. 10,045,074.

(60) Provisional application No. 62/301,616, filed on Feb. 29, 2016.

(51) Int. Cl.

| | |
|---|---|
| *H04N 21/442* | (2011.01) |
| *H04N 21/435* | (2011.01) |
| *H04N 21/475* | (2011.01) |
| *H04N 21/438* | (2011.01) |
| *H04N 21/61* | (2011.01) |
| *H04N 21/658* | (2011.01) |
| *H04H 60/43* | (2008.01) |
| *H04N 21/8352* | (2011.01) |
| *H04N 21/231* | (2011.01) |
| *H04H 60/31* | (2008.01) |
| *C09J 7/20* | (2018.01) |
| *E04F 13/08* | (2006.01) |
| *E04F 15/02* | (2006.01) |
| *H04N 21/234* | (2011.01) |
| *H04N 21/235* | (2011.01) |
| *H04N 21/24* | (2011.01) |
| *H04N 21/258* | (2011.01) |
| *H04N 21/6543* | (2011.01) |
| *H04N 21/81* | (2011.01) |
| *H04N 21/8358* | (2011.01) |
| *H04N 21/431* | (2011.01) |
| *H04N 21/84* | (2011.01) |
| *H04N 21/845* | (2011.01) |
| *H04H 60/56* | (2008.01) |
| *H04H 60/65* | (2008.01) |

(52) U.S. Cl.
CPC ....... *E04F 15/02155* (2013.01); *H04H 60/31* (2013.01); *H04H 60/43* (2013.01); *H04N 21/2353* (2013.01); *H04N 21/23109* (2013.01); *H04N 21/23418* (2013.01); *H04N 21/2407* (2013.01); *H04N 21/25841* (2013.01); *H04N 21/431* (2013.01); *H04N 21/435* (2013.01); *H04N 21/4383* (2013.01); *H04N 21/44204* (2013.01); *H04N 21/44222* (2013.01); *H04N 21/4756* (2013.01); *H04N 21/6118* (2013.01); *H04N 21/6543* (2013.01); *H04N 21/6582* (2013.01); *H04N 21/812* (2013.01); *H04N 21/8352* (2013.01); *H04N 21/8358* (2013.01); *H04N 21/84* (2013.01); *H04N 21/8456* (2013.01); *C09J 2201/128* (2013.01); *C09J 2201/40* (2013.01); *C09J 2203/314* (2013.01); *C09J 2433/00* (2013.01); *H04H 60/56* (2013.01); *H04H 60/65* (2013.01); *H04H 2201/90* (2013.01)

(58) Field of Classification Search
CPC ........... H04N 21/8358; H04N 21/6543; H04N 21/44222; H04N 21/25841; H04N 21/2407; H04N 21/2353; H04N 21/23418; H04N 21/6118; H04N 21/4383; H04N 21/4756; H04N 21/435; H04N 21/44204; H04N 21/2368; H04N 21/23614; H04N 21/23608
See application file for complete search history.

(56) References Cited

U.S. PATENT DOCUMENTS

| | | | |
|---|---|---|---|
| 7,788,696 B2 | 8/2010 | Burges et al. | |
| 7,797,249 B2 | 9/2010 | Schmeizer et al. | |
| 7,917,645 B2 | 3/2011 | Ikezoye et al. | |
| 8,150,096 B2 | 4/2012 | Alattar | |
| 8,185,733 B2 | 5/2012 | Schwartz et al. | |
| 8,510,770 B1* | 8/2013 | Oztaskent | H04L 67/22 |
| | | | 705/319 |
| 8,649,659 B2 | 2/2014 | Lalwaney | |
| 8,700,194 B2* | 4/2014 | Bauer | G10L 19/018 |
| | | | 700/94 |
| 8,964,126 B2 | 2/2015 | Harada et al. | |
| 9,094,715 B2* | 7/2015 | Neumeier | H04N 5/44591 |
| 9,203,538 B2* | 12/2015 | Anniballi | H04H 60/44 |
| 9,240,851 B2 | 1/2016 | Park | |
| 9,258,604 B1 | 2/2016 | Bilobrov et al. | |
| 9,412,330 B2 | 8/2016 | Keating et al. | |
| 9,465,995 B2 | 10/2016 | Harron et al. | |
| 9,609,391 B2 | 3/2017 | Oztaskent et al. | |
| 9,635,417 B2 | 4/2017 | Grant et al. | |
| 9,704,016 B2 | 7/2017 | Jang et al. | |
| 9,706,261 B2 | 7/2017 | Chen | |
| 9,906,843 B2 | 2/2018 | Yabu et al. | |
| 9,967,613 B2 | 5/2018 | Kitazato | |
| 9,986,306 B2 | 5/2018 | Nagorski et al. | |
| 9,992,527 B2 | 6/2018 | An et al. | |
| 10,200,765 B2 | 2/2019 | Yabu | |
| 2002/0083060 A1* | 6/2002 | Wang | G10L 19/018 |
| 2003/0046437 A1 | 3/2003 | Eytchison et al. | |
| 2003/0063217 A1* | 4/2003 | Smith | H04N 7/088 |
| | | | 348/460 |
| 2004/0143349 A1* | 7/2004 | Roberts | G11B 27/034 |
| | | | 700/94 |
| 2004/0189873 A1 | 9/2004 | Konig et al. | |
| 2005/0144455 A1* | 6/2005 | Haitsma | G06F 16/683 |
| | | | 713/176 |
| 2005/0149968 A1 | 7/2005 | Konig et al. | |
| 2006/0062426 A1 | 3/2006 | Levy et al. | |
| 2006/0182412 A1 | 8/2006 | Lefevre | |
| 2007/0052802 A1 | 3/2007 | Kasutani et al. | |
| 2007/0055500 A1* | 3/2007 | Bilobrov | G10L 25/48 |
| | | | 704/217 |
| 2007/0124756 A1* | 5/2007 | Covell | G06F 16/683 |
| | | | 725/18 |
| 2007/0143777 A1 | 6/2007 | Wang | |
| 2007/0192782 A1 | 8/2007 | Ramaswamy | |
| 2007/0217648 A1* | 9/2007 | Muehlbauer | G11B 27/11 |
| | | | 382/100 |
| 2008/0060036 A1* | 3/2008 | Cox | G06F 16/5866 |
| | | | 725/110 |
| 2008/0082510 A1* | 4/2008 | Wang | H04H 60/37 |
| 2010/0131970 A1 | 5/2010 | Falcon | |
| 2010/0293568 A1* | 11/2010 | Jarman | H04H 60/31 |
| | | | 725/14 |
| 2010/0318587 A1 | 12/2010 | Seet et al. | |
| 2010/0329547 A1* | 12/2010 | Cavet | G06K 9/4652 |
| | | | 382/164 |
| 2011/0075851 A1* | 3/2011 | LeBoeuf | H04R 29/00 |
| | | | 381/56 |
| 2011/0173208 A1 | 7/2011 | Vogel | |
| 2011/0273455 A1 | 11/2011 | Powar et al. | |
| 2011/0289098 A1* | 11/2011 | Oztaskent | H04N 21/233 |
| | | | 707/769 |
| 2011/0313856 A1* | 12/2011 | Cohen | G06Q 30/02 |
| | | | 705/14.49 |
| 2012/0089911 A1 | 4/2012 | Hosking et al. | |
| 2012/0117584 A1 | 5/2012 | Gordon | |
| 2012/0167140 A1 | 6/2012 | Park et al. | |
| 2012/0239175 A1 | 9/2012 | Mohajer et al. | |
| 2013/0011008 A1* | 1/2013 | Ikezoye | G06Q 20/10 |
| | | | 382/100 |
| 2013/0052939 A1 | 2/2013 | Anniballi et al. | |
| 2013/0054645 A1 | 2/2013 | Bhagavathy et al. | |
| 2013/0081097 A1 | 3/2013 | Park et al. | |
| 2013/0145414 A1 | 6/2013 | Yamagishi | |

(56) References Cited

U.S. PATENT DOCUMENTS

| | | |
|---|---|---|
| 2013/0152139 A1 | 6/2013 | Davis et al. |
| 2013/0205330 A1* | 8/2013 | Sinha .................... G06T 1/0021 725/28 |
| 2013/0212609 A1 | 8/2013 | Sinha et al. |
| 2013/0254793 A1* | 9/2013 | Anniballi ............... H04H 60/65 725/18 |
| 2013/0308818 A1* | 11/2013 | MacIntosh ........... G06T 1/0021 382/100 |
| 2013/0326573 A1 | 12/2013 | Sharon et al. |
| 2013/0345840 A1 | 12/2013 | Lempel et al. |
| 2014/0007152 A1* | 1/2014 | Pora ..................... H04N 21/254 725/18 |
| 2014/0013352 A1* | 1/2014 | Shavit ................. H04N 21/8358 725/34 |
| 2014/0059587 A1 | 2/2014 | Davis et al. |
| 2014/0082655 A1 | 3/2014 | Moon et al. |
| 2014/0089307 A1* | 3/2014 | Garside ................ H04L 9/3247 707/736 |
| 2014/0115627 A1* | 4/2014 | Lee ................. H04N 21/44008 725/34 |
| 2014/0193027 A1 | 7/2014 | Scherf et al. |
| 2014/0196077 A1* | 7/2014 | Gordon ............. H04N 21/8358 725/31 |
| 2014/0236988 A1 | 8/2014 | Harron et al. |
| 2014/0282662 A1* | 9/2014 | Major ................ H04N 21/8358 725/18 |
| 2014/0282693 A1 | 9/2014 | Soundararajan et al. |
| 2014/0325555 A1 | 10/2014 | Khader et al. |
| 2014/0337874 A1 | 11/2014 | Kitazato |
| 2015/0020094 A1 | 1/2015 | Moon et al. |
| 2015/0033500 A1 | 2/2015 | Block et al. |
| 2015/0089526 A1 | 3/2015 | Gordon |
| 2015/0106839 A1 | 4/2015 | Shrum, Jr. et al. |
| 2015/0120839 A1 | 4/2015 | Kannan et al. |
| 2015/0181263 A1 | 6/2015 | Gordon et al. |
| 2015/0237409 A1 | 8/2015 | Harper et al. |
| 2015/0302086 A1 | 10/2015 | Roberts et al. |
| 2015/0365709 A1 | 12/2015 | Cho et al. |
| 2016/0094877 A1* | 3/2016 | Heffernan ........ H04N 21/44008 725/19 |
| 2016/0127398 A1 | 5/2016 | Cohen |
| 2016/0275588 A1 | 9/2016 | Ye et al. |
| 2016/0316261 A1 | 10/2016 | Koshevoy |
| 2017/0048566 A1 | 2/2017 | Srinivasan |
| 2017/0048596 A1 | 2/2017 | Fonseca, Jr. et al. |
| 2017/0308556 A1* | 10/2017 | Gonzales-Brenes, Jr. .................... H04L 43/00 |
| 2017/0330474 A1* | 11/2017 | Rho ....................... G06Q 50/20 |

FOREIGN PATENT DOCUMENTS

| | | |
|---|---|---|
| CN | 1035401449 | 1/2014 |
| CN | 103581705 | 2/2014 |
| EP | 2 763 427 | 11/2011 |
| EP | 2 704 444 | 3/2014 |
| EP | 3 179 409 | 6/2017 |
| EP | 3 396 562 | 10/2018 |
| JP | 2001298433 | 10/2001 |
| JP | 2011217144 | 10/2011 |
| JP | 2012156643 | 8/2012 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

Office Action from U.S. Appl. No. 15/443,580, dated Dec. 14, 2017.
Office Action from U.S. Appl. No. 15/433,580, dated May 21, 2018.
Office Action from U.S. Appl. No. 16/015,811, dated Aug. 23, 2018.
International Preliminary Report on Patentability from International Application No. PCT/US2017/020003, dated Jun. 15, 2017.

* cited by examiner

METHOD AND SYSTEM FOR DETECTING AND RESPONDING TO CHANGING OF MEDIA CHANNEL

REFERENCE TO RELATED APPLICATIONS

This is a continuation of U.S. patent application Ser. No. 16/015,827, filed Jun. 22, 2018, which is a continuation of U.S. patent application Ser. No. 15/443,615, filed Feb. 27, 2017, which issued as U.S. Pat. No. 10,045,074 and claims priority to U.S. Provisional Patent Application No. 62/301,616, filed Feb. 29, 2016, the entirety of each of which is hereby incorporated by reference.

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving media content that is being output to the television. But the television itself may merely receive and render the media content and may have no indication of the selected channel. A similar issue could exist for a loudspeaker or other media presentation device.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered (e.g., being already rendered, currently being rendered, or being in queue to be rendered) by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over or otherwise in conjunction with the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference fingerprint stream of each of the channels available to provide media content to the media presentation device (e.g., each of the channels within a subscription plan for a set-top box that supplies media content to the media presentation device) and that maps each reference fingerprint stream to the channel on which the media content is provided. As the media presentation device receives and renders given media content, the media presentation device may then generate a query fingerprint stream of that media content and, through a network communication interface, report the generated query fingerprint stream to the network server for analysis. As the network server receives the query fingerprint stream from the media presentation device, the network server may then compare the query fingerprint stream with the reference fingerprint streams of various channels to find a match with a reference fingerprint stream and to thereby determine that the channel on which the media content is arriving is the channel that the reference data maps with that reference fingerprint stream.

Upon thereby determining the channel on which the media content is arriving, the network server may then communicate an indication of the channel to the media presentation device, and the media presentation device may take channel-specific action, such as superimposing channel-specific content (e.g., channel identification or associated content) in the media stream being rendered by the media presentation device for instance. Alternatively, the network server itself or another entity may take channel-specific action based on the determined channel, such as superimposing channel-specific content in the media stream being transmitted to the media presentation device for rendering.

When channel-specific action is taken in this process, it can be important to ensure that channel being rendered by the media presentation device is in fact the determined channel as to which the channel-specific action is taken. This is particularly the case in a situation where the channel-specific action is perceived by a user who is watching or listening to the rendered channel. For example, if a television is rendering a particular video channel and the process results in superimposing a channel-identification graphic on the television display, it can be especially important from a user-experience perspective that the channel identification be correct. If the channel identification is incorrect, the result could be user confusion and other issues. Further, correctness of the channel identification could be important in other scenarios as well.

One situation where this can become an issue is when the channel being rendered by the media presentation device changes. For instance, a user who is watching or listening to a particular channel on the media presentation device may change the channel at the associated receiver (e.g., set top box or radio) that is providing the media content to the media presentation device. Thus, the channel that is being rendered by the media presentation device could change from an old channel to a new channel. And, as discussed above, while the receiver may be aware of this channel change, the media presentation device may not.

When the user changes the channel being rendered by the media presentation device, any channel-specific superimposed content might no longer be relevant to the media content of the new channel being rendered by the media presentation device. Furthermore, there may be different channel-specific content associated with the media content of the new channel that can be properly superimposed over that new media content.

Given this, when a channel change occurs, it may be desirable to (i) stop taking channel-specific action such as displaying channel-specific superimposed content over the media content, (ii) start taking different channel-specific action, such as displaying different channel-specific superimposed content over the media content, or (iii) do both (i) and (ii). Regardless, in order to perform any of these operations, it would be beneficial to detect the channel change rapidly.

Disclosed herein is a method and system for detecting and responding to a channel change. In accordance with the disclosure, once a channel being rendered by a media presentation device has been identified (e.g., through a process as discussed above), a server or other entity will then detect one or more mismatches between a query fingerprint stream of the media content being rendered by the media presentation device and a reference fingerprint stream expected for the media content of the identified channel. Upon detecting the mismatch(es), the server or other entity could then take any of the actions noted above, such as stopping taking channel-specific action as to the old channel and/or starting to take channel-specific action as to the new channel.

Accordingly, in one respect, disclosed is a method of detecting and responding to a change of channels at a media presentation device. As disclosed, the method includes, while the media presentation device is presenting media content determined to be of a first channel, detecting a threshold mismatch between (i) a query fingerprint stream representing the media content being presented by the media presentation device and (ii) a reference fingerprint stream representing the first channel, the threshold mismatch indicating a likelihood that the media presentation device has transitioned from presenting the first channel to presenting a second channel. Further, the method includes, responsive to detecting the threshold mismatch, changing an overlay on the presented media content, where changing the overlay involves removing superimposed content associated with the first channel.

In another respect, the disclosed is a method for detecting and responding to a change of channels. As disclosed, the method includes a computing system receiving a plurality of query fingerprints representing media content rendered over time by a media presentation device, in a situation where, based on at least a portion of the received query fingerprints, the rendered media content has been identified as being a first channel of media content. Further, the method includes comparing one or more of the received query fingerprints to a corresponding one or more reference fingerprints representing the first channel of media content, and, based on the comparing, determining a likelihood that the media content being rendered by the media presentation device is no longer the first channel of media content. In turn, the method then includes, responsive to the determined likelihood that the media content being rendered by the media presentation device is no longer the first channel of media content, discontinuing a channel-specific action with respect to the rendering of the media content by the media presentation device.

Still further, in another respect, disclosed is a system for carrying out such features. As disclosed, the system includes a network communication interface, a processing unit, non-transitory data storage, and program instructions stored in the non-transitory data storage and executable by the processing unit to carry out operations including (i) receiving from a media presentation device, via the network communication interface, a query fingerprint stream representing media content being presented by the media presentation device, where the query fingerprint stream has been determined to represent a first channel, (ii) detecting a threshold mismatch between the received query fingerprint stream and a reference fingerprint stream representing the first channel, wherein the threshold mismatch indicates a likelihood that the media presentation device has transitioned from presenting the first channel to presenting a second channel, and (ii) responsive to detecting the threshold mismatch, changing an overlay on the presented media content, wherein changing the overlay involves removing superimposed content associated with the first channel.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
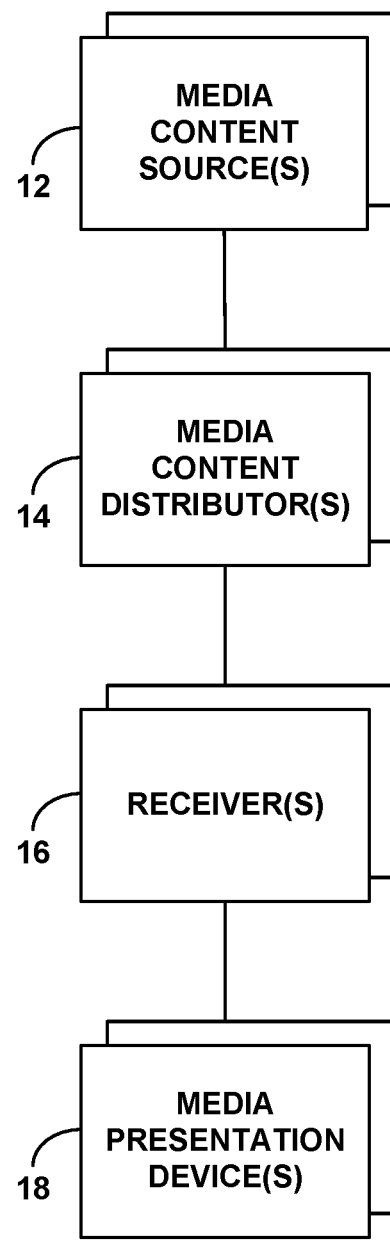
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
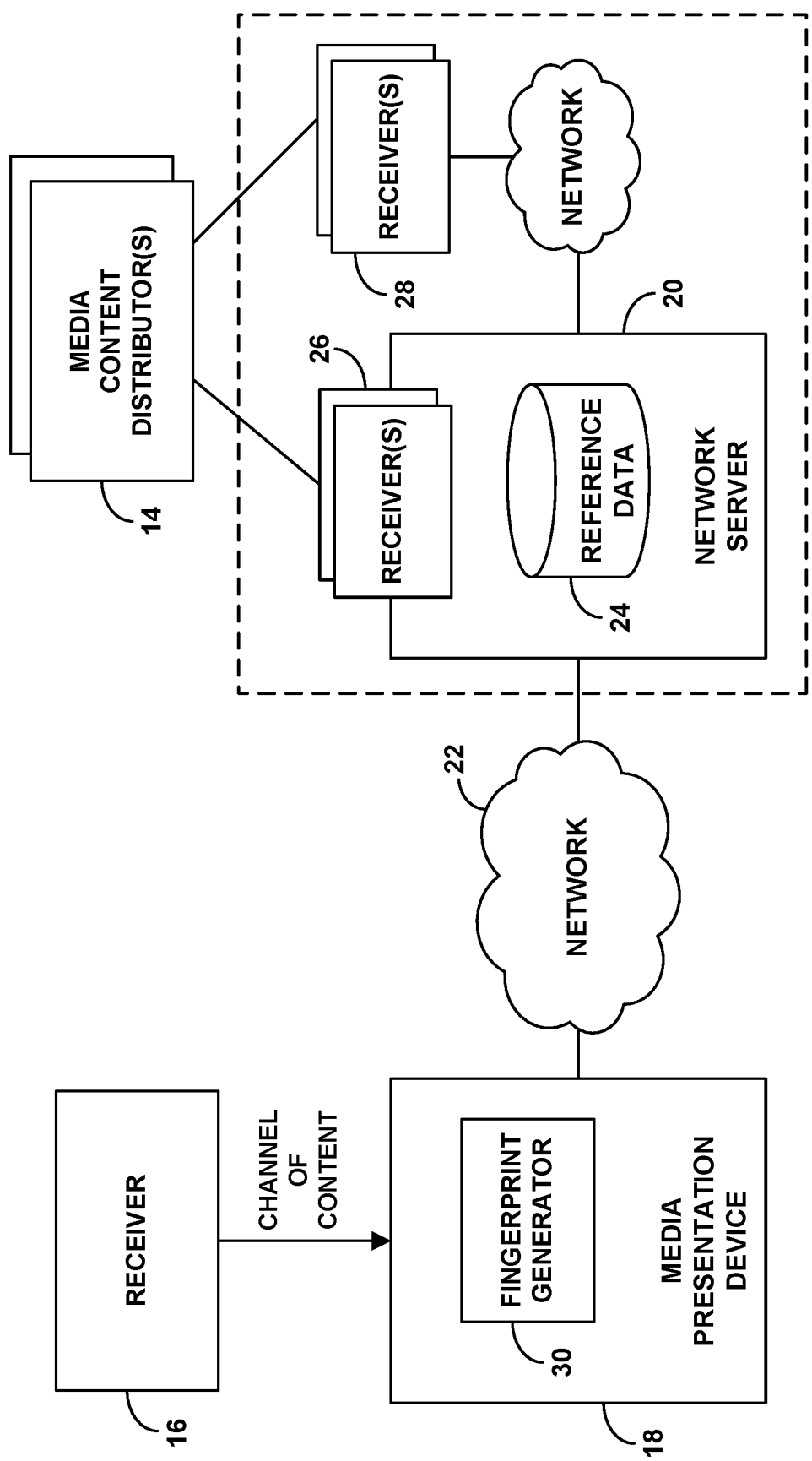
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to provide a fingerprint stream of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18.

The reference data, which could be stored in a relational database or other form, could include a respective reference fingerprint stream for each channel, perhaps a reference fingerprint stream of media content that was most recently carried by the channel (e.g., on a sliding window basis covering a most recent period of time). Alternatively or additionally, the reference data could include a respective reference fingerprint stream of each media content program (e.g., television broadcast, radio broadcast, streaming media file, etc.) that is available and/or scheduled to be carried on a particular channel. As such, the reference data could map each reference fingerprint stream to a channel on which the associated media content (i.e., the content uniquely identified by the reference fingerprint stream) is or may be carried.

In mapping reference fingerprint streams to channels, the reference data could characterize the channels by various attributes, to help distinguish the channels from each other. For example, where a receiver or other such device provides multiple different channels selectable by channel number or name, the reference data could characterize the channels by their respective channel numbers or names. And as another example, where each channel carries a particular content source's content, such as the content of one of a particular broadcaster for instance, the reference data could characterize the channels by their respective content sources' identities.

Still further, where more than one content distributor (e.g., multichannel distributor) distributes content sources' content, the reference data could characterize the channels by their respective content distributors' identities. And for channels that are broadcast in particular geographic locations, such as a particular DMAs, the reference data could characterize the channels by their broadcast locations. In practice, the reference data could correlate each reference fingerprint stream with one or more of these or other attributes.

The network server 20 or other entity operating in accordance with the present disclosure could establish some or all of this reference data by analyzing media content arriving on each of the various channels (e.g., at least the media content arriving on each of various channels that are available to a receiver that serves the media presentation device).

To facilitate this, as shown, the server could include or be interconnected with one or more receivers 26 that are configured to receive media content from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media content arriving on each channel and to generate for each channel a reference fingerprint stream of the channel's media content, using any media fingerprinting process now known or later developed.

Considering video content, without limitation, an example digital fingerprinting process could apply on a per video frame basis (e.g., per key frame, or for each frame) and could involve establishing a representation of luminosity and/or other video characteristics.

For instance, for a given video frame, the server could programmatically divide the frame into a grid, and the server could measure luminosity of the frame per grid cell and generate a bit string with each bit or series of bits representing luminosity of a respective grid cell, or representing a weighted difference between the luminosity of certain defined pairs of the grid cells, or the like. Further, the computing system could apply this process on an ongoing basis to generate the reference fingerprint stream over time as a sequence of reference fingerprints. For instance, the server could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Many other digital fingerprinting processes could be used as well.

In practice, the server could be configured to receive concurrently on multiple such channels (perhaps all of the channels) and to analyze and generate respective reference fingerprint streams for the channels in parallel, or the server might be configured to hop from channel to channel, possibly repeatedly cycling through the channels, to analyze and generate a respective reference fingerprint stream for each channel. Further, the server could continue to do this in real-time, saving a respective fingerprint stream of at least a most recent time window of media content for each channel, for reference. And the server could record each channel's reference fingerprint stream in the reference data in association with a characterization of the channel (e.g., with attributes such as those noted above) and timestamp information indicating a time of receipt of the associated media content. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint stream.

Alternatively or additionally, the server could receive such reference fingerprint streams from external media receiver devices 28, such as from media receiver devices located in various respective DMAs. This implementation could be especially useful for channels that are provided only in specific DMAs. In this implementation, each media receiver device 28, perhaps interworking with an associated computer server, could be configured to receive and analyze the respective media content arriving on each channel available to the media receiver device, to generate for each such channel a reference fingerprint stream of the channel's media content using any fingerprint process now known or later developed, and to provide the reference fingerprint stream (e.g., periodically or continuously) via a network connection to the server 20. Further, the media receiver device 28 could provide server 20 with information characterizing the channel on which the media content represented respectively by each such reference fingerprint stream is arriving, such as the channel number and other attributes noted above. And the server could thus record each received reference fingerprint stream along with its associated channel attributes.

Still alternatively or additionally, the server could receive or perhaps establish such reference fingerprint streams for media content programs that are available or scheduled to be provided on particular channels. For instance, providers or distributors of various media content programs could generate reference fingerprint streams for the media content programs (e.g., reference fingerprint streams over the course of respective media content programs), again using any media fingerprinting process now known or later developed, and those reference fingerprint streams could be provided to the server. Alternatively, the server could receive advance copies of the media content programs and could itself generate such reference fingerprint streams. Further, the server could receive or determine from program guide information the channel on which the media content program is available or scheduled to be provided, and perhaps a day and time at which the media content is scheduled to be provided. The server could then record each media content program's reference fingerprint stream in the reference data in association with the channel on which the media content program is available or scheduled to be carried, likewise with associated channel attributes, and perhaps in association with a day and time at which the media content program is scheduled to be provided.

Given this or other such reference data, when the server is presented with a query fingerprint stream of media content that was received on an unknown channel, the server could match the query fingerprint with one of the stored reference fingerprints, using any fingerprint comparison process now known or later developed, and could thereby conclude that the media content at issue arrived on the channel that the reference data maps to the matching reference fingerprint.

To facilitate this comparison, the query fingerprint stream would preferably be generated using the same fingerprinting process that is used to generate each of the reference fingerprints, so that portions of the query fingerprint would correspond with portions of each reference fingerprint. For instance, for video content, the query fingerprint and each reference fingerprint could be generated on a per-frame basis as discussed above, using the same grid and same basis for representing luminosity values and/or other characteristics in the same manner.

To compare the query fingerprint stream with a reference fingerprint stream, the server could compare corresponding portions of the fingerprints with each other to determine whether the portions match exactly or within defined tolerances. For example, if the query fingerprint stream comprises a sequence of query fingerprints representing respective frames of media content, and if each reference fingerprint stream comprises a sequence of reference fingerprints representing respective frames of media content, the server could compare individual ones of the query fingerprints with individual ones of the reference fingerprints, in search of a match. Further, to refine the matching process, the server could compare subsets of the query fingerprints with subsets of reference fingerprints in particular reference fingerprint streams, in search of a more specific match.

Considering video content, for instance, the server could conduct this analysis on a per-video-frame basis, comparing a query fingerprint of a frame against a reference fingerprint of a frame, such as by computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

This fingerprint comparison process could be thus conducted with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media. Further, this comparison could be done on a sliding window basis, by comparing a time segment of the query fingerprint stream with numerous time segments of the reference fingerprint stream, or vice versa, to account for time shifting.

In addition, the fingerprint comparison process could be conducted at a desired rate, which could also contribute to the level of granularity of the analysis. In particular, the server could compare a latest query fingerprint or latest sliding window of query fingerprints with the reference fingerprints every T seconds, defining a comparison interval, with a longer comparison interval making the analysis more coarse, or a shorter comparison interval making the analysis more granular. For example, the server could compare a latest query fingerprint or latest sliding window of query fingerprints with the reference fingerprints every second as a relatively coarse analysis, or the server could compare a latest query fingerprint or latest sliding window of query fingerprints with the reference fingerprints every 0.2 seconds as a more granular analysis. Other examples are possible as well.

Thus, if the server is faced with a query fingerprint stream of media content that is being rendered by the media presentation device 18, the server could compare the query fingerprint stream with the reference fingerprint streams in the reference data to determine if the query fingerprint stream matches a reference fingerprint. And if the server thereby finds a matching reference fingerprint stream, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a query fingerprint stream of the media content that is being rendered by the media presentation device and to transmit the query fingerprint stream to server 20 for analysis.

For instance, as shown in FIG. 2, the media presentation device could include a fingerprint generator 30, which could be configured to generate a digital fingerprint stream of media content being rendered by the media presentation device. Such a fingerprint generator could be configured to generate the fingerprint stream of media content as the media presentation device is receiving the media content on a channel from a receiver 16 and/or as the media presentation device is processing the media content for presentation. As such, the fingerprint generator could receive as input a copy of the media content arriving at the media presentation device from the receiver and/or being processed for presentation by the media presentation device, and to generate a fingerprint stream of the media content, using the same fingerprinting process used to generate the reference fingerprint streams.

In practice, the fingerprint generator could be configured to generate such a query fingerprint stream on an ongoing basis, such as on a per frame basis (e.g., per key frame) or other basis. And the media presentation device could be configured to transmit the query fingerprint stream via network 22 to a server 20 for analysis. By way of example, the media presentation device could be configured to periodically, continuously, or from time to time transmit to the server a query fingerprint stream representing a latest frame, series of frames or other segment or portion of the media content being rendered by the media presentation device. In particular, the media presentation device could generate a message carrying the latest generated query fingerprint(s), along with one or more timestamps and/or other such data as well as an identifier of the media presentation device, and could transmit the message to the server's IP address. And the server could thereby receive the query fingerprint stream for analysis.

Alternatively, the media presentation device could transmit to the server, and the server could thus receive, various data regarding the media content being rendered by the media presentation device, likewise on an ongoing basis or other basis, to enable the server itself or another entity to generate a query fingerprint stream of the media content being rendered by the media presentation device. For example, the media presentation device could transmit to the server portions of the media content being rendered by the media presentation device, such as individual frames (e.g., snapshots) or other segments of the media content. And the server could generate a query fingerprint stream of that media content for analysis.

Through the process described above, the server could thus compare the query fingerprint stream of the media content being rendered by the media presentation device with the reference fingerprint streams in the reference data. And as noted above, if the server thereby finds a matching reference fingerprint stream, the server could determine the channel that the reference data maps with the matching reference fingerprint stream and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel ratings or analytics system to measure the extent to which particular channels are being presented by media presentation devices. For instance, the media presentation device could regularly (e.g., periodically) report to the server a query fingerprint stream of the media content that the media presentation device is rendering, and the server could carry out processes such as those discussed herein to determine the channel being rendered. For each unit of time that the server thus determines that a channel is being rendered by the media presentation device, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content being rendered. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a query fingerprint of the media content being rendered by the media presentation device and the server determining that the received fingerprint matches a reference fingerprint stream of media content that the server is concurrently receiving (or has scheduled for the same time) on a known channel.

In some cases, however, there may be a time difference between when the media presentation device renders the media content and timestamps and transmits the query fingerprint stream to the server and when the server receives the media content on the known channel and otherwise has the reference fingerprint stream timestamped. As noted above, the server could account for this time difference by comparing the received fingerprint over a sliding window of the reference fingerprint or vice versa.

Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, once the server 20 or another entity has identified the channel that is being rendered by the media presentation device, and perhaps while associated channel-specific action is being taken in response (e.g., while channel-specific content is being superimposed and/or while channel ratings information is being recorded based on the channel being presented), the server or other entity could detect a threshold fingerprint mismatch between the query fingerprint stream and the reference fingerprint stream. As explained above, this threshold mismatch could occur when the channel being rendered by the media presentation device is changed, such as when a user changes the channel on the associated receiver. Thus, the threshold mismatch could be indicative of a channel change.

In practice, for instance, once the channel has been identified, the server could proceed (e.g., continue) to compare a query fingerprint stream of the media content being rendered by the media presentation device with a reference fingerprint stream of the identified channel's media content. And the server could thereby detect when a threshold mismatch between the query fingerprint stream and the reference fingerprint stream occurs and, in response to detecting the threshold mismatch, could take one or more actions such as those noted above. For example, the server could then responsively discontinue the channel-specific action that is being taken as to the identified channel. Further, the server could engage in a new channel-identification process such as that described above (e.g., by comparing the query fingerprint stream with various reference fingerprint streams corresponding with known channels) so as to newly identify the channel that is currently being rendered by the media presentation device, and the server could then take channel-specific action as described above based on the new channel identification.

To facilitate this, once the channel has been identified, the server could receive (e.g., continue to receive) from the media presentation device, or to otherwise establish or obtain, a query fingerprint stream of the media content being rendered by the media presentation device, as discussed above. Further, the server could compare the query fingerprint stream, perhaps on a frame-by-frame basis, with a reference fingerprint stream established for the identified channel as discussed above. (In performing this comparison, the server could exclude any channel-specific content that is currently being superimposing over the media content being rendered by the media presentation device, as at issue is a comparison between the underlying media content of the channel.)

Thus, in an implementation where the query fingerprint stream defines a sequence of query fingerprints and where the reference fingerprint stream defines a sequence of reference fingerprints, the server could detect a threshold mismatch between the query fingerprint stream and a reference fingerprint stream by detecting at least a threshold mismatch between (i) at least one of the query fingerprints and (ii) a corresponding at least one of the reference fingerprints.

Figure 3:
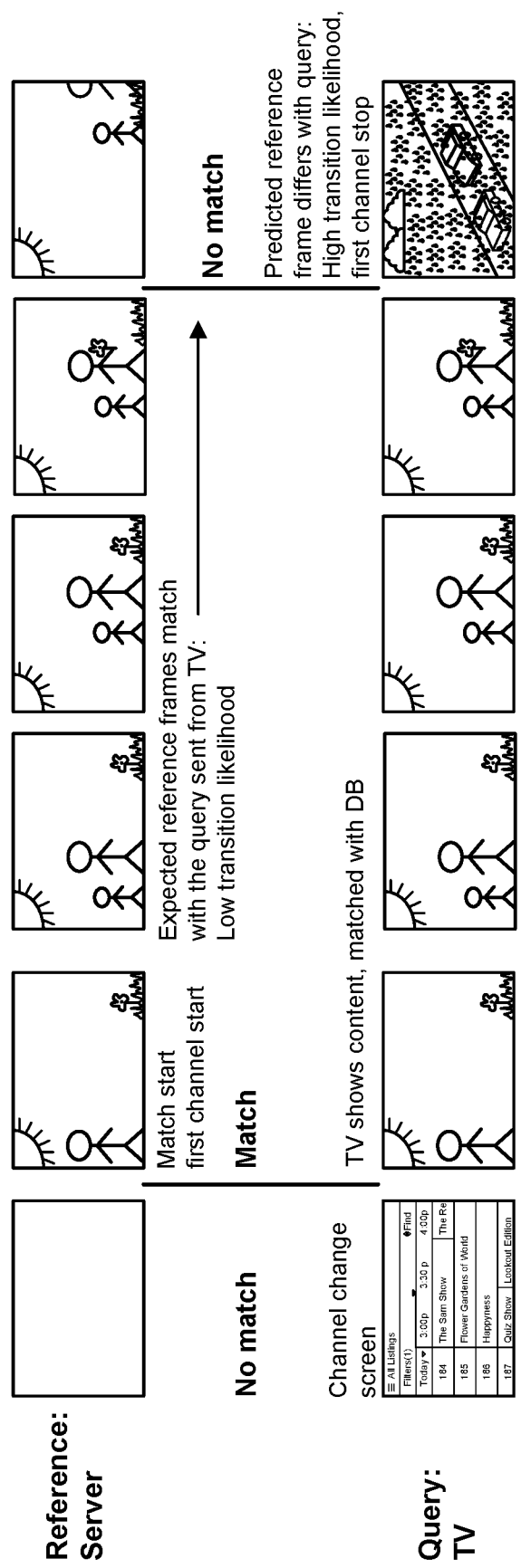
FIG. 3 is an illustration of how a sequence of query fingerprints could be compared with a sequence of reference fingerprints as a basis to determine likelihood of channel change.

FIG. 3 is an illustration of how this process can work in practice, in a scenario where a television or other media presentation device generates a stream of query fingerprints corresponding with respective frames of media content being rendered by the media presentation device and sends the stream to a server that stores reference fingerprint streams of known channels. This figure provides simplified graphics representing frames of media content, which could be continuous frames of video (even though, for simplicity, there are clear jumps in continuity in the simplified illustrations) or could be key frames of video or the like.

Moving from left to right in this figure, the server compares a first query fingerprint of a first frame of media content being rendered by the media presentation device with various reference fingerprints, and the server finds no match. Thus, at this stage, the channel being rendered by the media presentation device is not yet identified.

Continuing with the example, however, the server then matches each of the next four query fingerprints with a corresponding sequence of four fingerprints of a particular reference fingerprint stream representing a known channel. Once the server matches at least the first pair of these fingerprints (and perhaps a first threshold number of such pairs), the server may thus conclude that the channel being rendered by the media presentation device is the channel represented by the matching reference fingerprint stream. Therefore, the server could begin to take action specific to that determined channel, such as superimposing or causing to be superimposed particular channel-specific content on the media being rendered by the media presentation device.

Further, as the server continues to find these matches between the query fingerprint stream and the reference fingerprint stream of the identified channel, the server could conclude that the identified channel is continuing to be rendered by the media presentation device. Put another way, at this stage, there is a low (or zero) likelihood that the channel has changed, because the expected reference frames, represented by reference fingerprint stream, match the query frames represented by the query fingerprint stream. Therefore, the server could continue to take the channel-specific action, such as by allowing or continuing to cause channel-specific content to be superimposed.

Continuing further, the server then determines that the right-most query fingerprint does not match the expected next reference fingerprint in the reference fingerprint stream. Thus, the server could conclude at this point that the media content of the identified channel is no longer being rendered by the media presentation device, possibly because a user changed channels. Put another way, at this stage, there is a high likelihood that the channel has changed, because the expected reference frame, represented by the reference fingerprint stream, does not match the query frame represented by the query fingerprint stream. Given this, the server could therefore discontinue the channel-specific action that was being taken, such as by stopping or causing to stop superimposing of content specific to the channel, for instance.

While this example could work well in practice, a more robust process for detecting and responding to likely channel-changing could also be carried out. In the more robust process, the server could apply a distance function to one or more sequential pairs of query and expected reference fingerprints. Such a distance function could take on a value of near 0 (zero) when a pair of fingerprints are the same, and may grow larger with the difference between the fingerprints. The server could compute the sum of these distances for t pairs and could then map the sum, using a sigmoid function, to a range of 0 to 1. This range could thus indicate a probability that the pairs of fingerprints are from different media content, possibly due to a channel change.

More formally, by way of example, the server could calculate:

$$\sigma\left(\sum_{i=0}^{t} d(f_r^i, f_q^i)\right)$$

where $f_r^i$ is the ith most-recent reference fingerprint and $f_q^i$ is the ith most-recent query fingerprint. Here, the value of $d(f_r^i, f_q^i)$ could be determined in various ways. For instance, if the fingerprints are represented as fixed-length strings of bits, this function could count the number of mismatches between the respective bit locations in the fingerprints, e.g., a Hamming distance. Other ways of determining a distance are also possible.

In some embodiments, the server could normalize each output of $d(f_r^i, f_q^i)$ so that its midpoint is zero. For instance, for 32-bit fingerprints, the minimum Hamming distance is 0 and the maximum Hamming distance is 32. Therefore, the server could map this possible range of 0 to 32 to a range of −16 to 16.

The sigmoid function σ could be any function that maps a domain that takes on values from −n to n to a range of 0 to 1, so that the values could represent probabilities. One possible example of many is:

$$\sigma(k) = \frac{1}{1 - e^{-k}}$$

In this fashion, the server could evaluate the sum of differences over the last t pairs of fingerprints and could map the sum to a probability that indicates a likelihood of whether a change in displayed media content has occurred. If the output of the sigmoid function is near zero, a channel change is deemed unlikely or non-existent. Whereas, the closer the output is to 1, the more likely it is that a channel change has occurred.

Thus, continuing with the example above, if the server compares t sequential pairs of 32-bit query and expected reference fingerprints and computes for each pair a Hamming distance that the server maps to a value in the range of −16 to 16, the server could sum those values and could apply a sigmoid function to establish based on that analysis a likelihood that the channel being rendered by the media presentation device has been changed.

Figure 4:
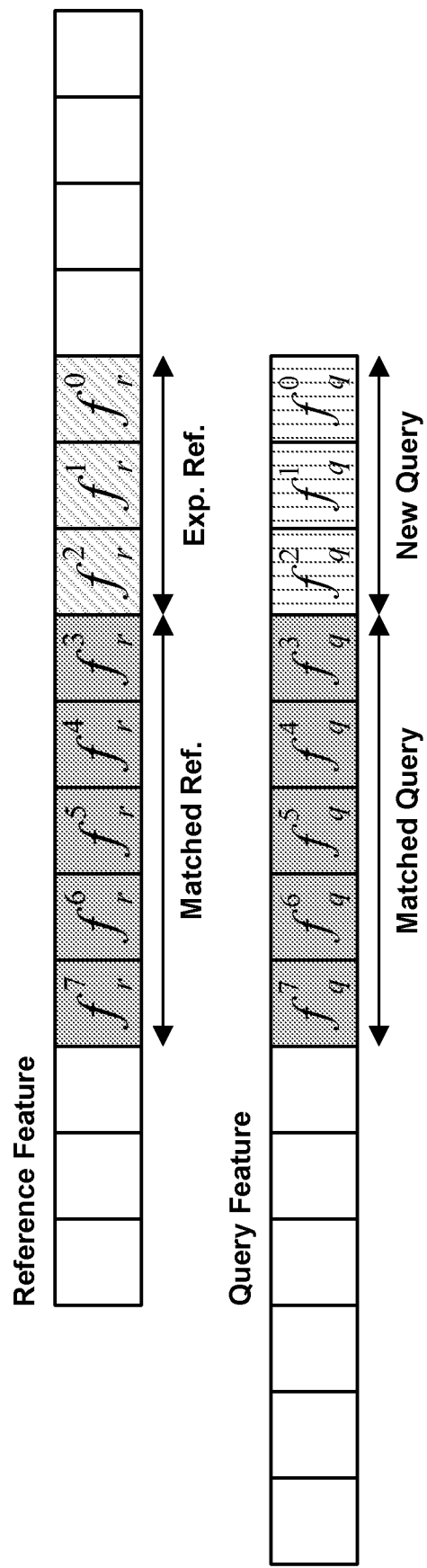
FIG. 4 is another illustration of how a sequence of query fingerprints could be compared with a sequence of reference fingerprints as a basis to determine likelihood of channel change.

FIG. 4 depicts an example of this in a scenario where t=3. In particular, the three most-recent query fingerprints $f_q^0$, $f_q^1$, and $f_q^2$ in this example are compared to three respective reference fingerprints $f_r^0$, $f_r^1$, and $f_r^2$. Based on the cumulative differences between the fingerprints in each pair, the resulting output of the sigmoid function could then indicate the likelihood that the media content being rendered by the media presentation device is no longer the previously-identified media content, perhaps indicating that the channel has been changed. The server could then repeat this process, on a sliding-window basis, for each newly-received query fingerprint or sequence of query fingerprints.

With this more robust process or with another process that establishes a statistical probability that the channel being rendered by the media presentation device has been changed, the server could then use the established probability as a basis to decide whether to take action in response. For example, the server could determine if the established probability is at least as high as a threshold probability that is deemed sufficient to support taking action based on a channel change, such as a probability of 0.9 or above for instance.

If the server determines that the established probability is not threshold high, then the server could responsively not take action based on a channel change. For instance, the server could respond to this determination by continuing to allow or cause superimposition of content specific to the identified channel and/or continuing to record ratings data indicating that the identified channel is being presented.

Whereas, if the server determines that the established probability is threshold high, then the server could take action based on a channel change. For instance, the server could responsively respond to this determination by discontinuing the superimposing of content specific to the identified channel and/or discontinuing recording of ratings data indicating that the identified channel is being presented. Further, in this case, the server could also responsively work to identify the channel now being rendered by the media presentation device, through the process described above for instance, and could then take channel-specific action based on that newly identified channel. Other examples are possible as well.

In practice, the fingerprint comparison that the server conducts to detect a channel change would optimally be with respect to a latest received query fingerprint or latest sliding window of received query fingerprints. By comparing a most recent portion of the query fingerprint stream with a corresponding portion of the reference fingerprint stream that represents the channel being rendered, the server could help to ensure a most timely detecting of a channel change.

In addition, the fingerprint comparison interval used for detecting a channel change could be shorter than the fingerprint comparison interval used for identifying the channel being rendered. For instance, when comparing a query fingerprint stream with reference fingerprint streams to determine the channel being rendered by the media presentation device, the server could apply a fingerprint comparison interval on the order of one second. Whereas, when comparing a query fingerprint stream with the reference fingerprint stream of the identified channel, the server could apply a fingerprint comparison interval on the order of 0.2 seconds, to help ensure that the server detects a channel change quickly enough. Thus, the server could use a longer comparison interval to identify the channel being rendered in the first place, the server could then reduce the comparison interval to monitor for a channel change, and, upon detecting a channel change, the server could then again use a longer comparison interval to identify the channel being rendered.

Further, note that while the discussion herein focuses primarily on server 20 detecting the likelihood of a channel change and taking action or causing action to be taken in response, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, the media presentation device could itself refer to the reference data to identify the channel that the media presentation device is rendering, the media presentation device could then detect a threshold mismatch between a fingerprint stream of the media content that it is rendering and a reference fingerprint stream of the identified channel, and the media presentation device could take or cause to be taken action in response, such as changing a channel-specific overlay superimposed on the media content presentation. Other examples are possible as well.

Figure 5:
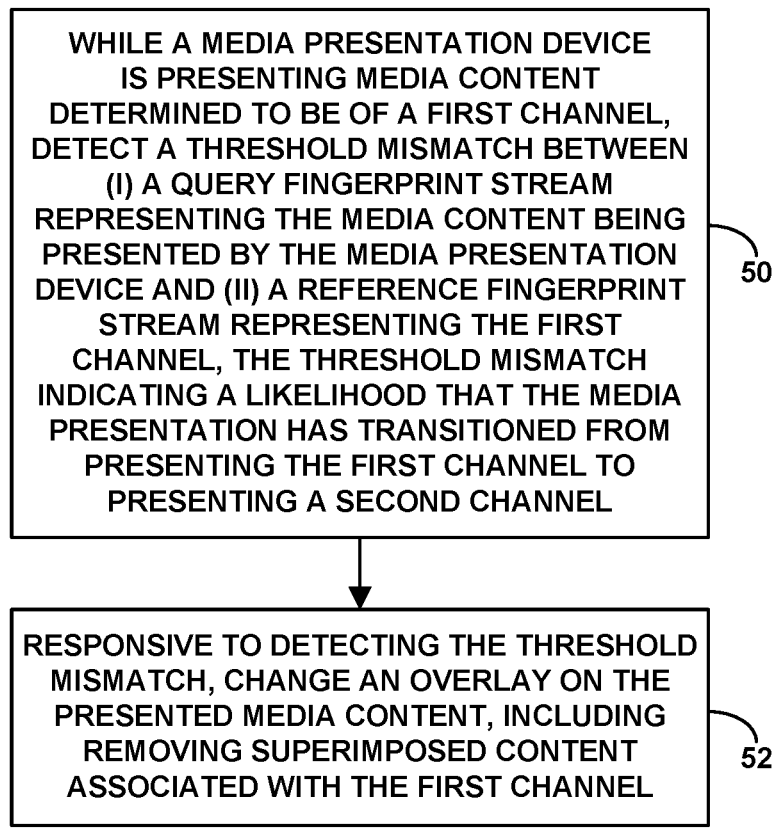
FIG. 5 is a flow chart depicting operations that can be carried out in accordance with the present disclosure.

FIG. 5 is next a flow chart depicting operations that can be carried out in an example method, to detect and respond to a change of channels at a media presentation device. One or more of the operations in the method depicted by FIG. 5 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 5, at block 50, the method includes, while the media presentation device is presenting media content determined to be of a first channel, detecting a threshold mismatch between (i) a query fingerprint stream representing the media content being presented by the media presentation device and (ii) a reference fingerprint stream representing the first channel, where the threshold mismatch indicates a likelihood that the media presentation device has transitioned from presenting the first channel to presenting a second channel. And at block 52, the method includes, responsive to detecting the threshold mismatch, changing an overlay on the presented media content, where changing the overlay involves removing superimposed content associated with the first channel (e.g., an identification of the first channel, such as a graphical overlay identifying the first channel if the content is video content).

In addition, the method could include, responsive to the detecting the threshold mismatch, identifying the second channel, in which case the act of changing the overlay could be further responsive to the identifying of the second channel and could involve adding superimposed content associated with the identified second channel (e.g., an identification of the second channel, such as a graphical overlay identifying the second channel). In practice, for instance, the act of identifying the second channel could involve comparing the query fingerprint stream with reference fingerprint streams respectively representing a plurality of channels, and determining based on the comparing that the query fingerprint stream matches a reference fingerprint stream representing the second channel.

Figure 6:
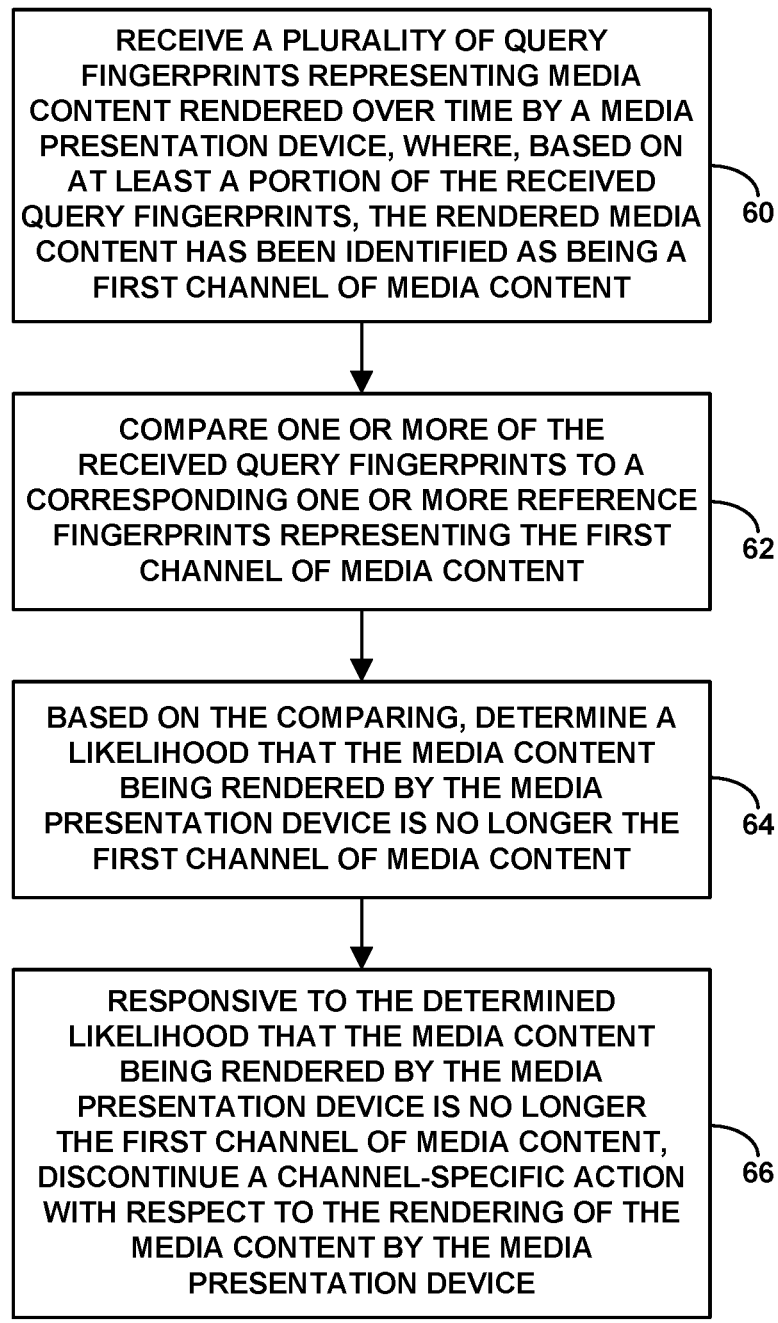
FIG. 6 is another flow chart depicting operations that can be carried out in accordance with the present disclosure.

FIG. 6 is next another flow chart depicting operations that can be carried out in an example method, to detect and respond to a change of channels at a media presentation device, which could similarly be implemented by one or more entities and/or embodied on a non-transitory data storage as discussed above. Further, features of this method could be applied in the context of the method shown in FIG. 5, and vice versa.

As shown in FIG. 6, at block 60 (which could occur concurrently with the subsequent operations), the method includes the computing system receiving a plurality of query fingerprints representing media content rendered over time by the media presentation device, in a situation where, based on at least a portion of the received query fingerprints, the rendered media content has been identified as being a first channel of media content. Further, at block 62, the method includes comparing one or more of the received query fingerprints to a corresponding one or more reference fingerprints representing the first channel of media content. And at block 64, the method includes, based on the comparing, determining a likelihood that the media content being rendered by the media presentation device is no longer the first channel of media content. At block 66, the method then includes, responsive to the determined likelihood that the media content being rendered by the media presentation device is no longer the first channel of media content, discontinuing a channel-specific action with respect to the rendering of the media content by the media presentation device.

In this method, the channel-specific action could be based on the media content having been identified as the first channel of media content and could include superimposing first-channel-specific content on the media content being rendered by the media presentation device (e.g., superimposing content specific to the first channel, such as an identification of the first channel (e.g., a graphical representation if the content comprises video content)). In that case, the act of discontinuing the channel-specific action with respect to the rendering of the media content by the media presentation device could involve discontinuing the superimposing of the first-channel-specific content on the media content being rendered by the media presentation device.

In addition, the method could include, responsive to the determined likelihood that the media content being rendered by the media presentation device is no longer the first channel of media content, engaging in a process to identify the media content being rendered by the media presentation device as being a second channel of media content. For instance, the computing system could compare one or more of the query fingerprints with a corresponding one or more reference fingerprints corresponding with known channels, to find that the query fingerprint(s) match the reference fingerprint(s) of the second channel, thereby establishing that the media content being rendered by the media presentation device is media content of the second channel.

Further, in another implementation of the method, the channel-specific action could be based on media content having been identified as the first channel of media content and could involve recording channel-ratings data based on presentation of the first channel by the media presentation device as discussed above). In that case, the act of discontinuing the channel-specific action with respect to the rendering of the media content by the media presentation device could involve one or more actions such as (i) discontinuing the recording of channel-ratings data based on presentation of the first channel by the media presentation device and/or (ii) recording channel-ratings data indicating discontinuation of presentation of the first channel by the media presentation device.

In addition, in line with the discussion above, the act of comparing the one or more received query fingerprints to the corresponding one or more reference fingerprints could involve comparing a particular one of the query fingerprints with a corresponding particular one of the reference fingerprints. And in that case, the act of determining, based on the comparing, the likelihood that the media content being rendered by the media presentation device is no longer the first channel of media content could involve determining based on the comparing that the particular query fingerprint does not match the particular reference fingerprint.

And further in line with the discussion above, the act of comparing the one or more received query fingerprints to the corresponding one or more reference fingerprints could involve comparing t of the query fingerprints with a corresponding t of the reference fingerprints, where t>1. And in that case, the act of comparing the t query fingerprints with the corresponding t reference fingerprints and determining based on the comparing the likelihood that the media content being rendered by the media presentation device is no longer the first channel of media content could involve (a) computing distances between the t query fingerprints and the t reference fingerprints, (b) summing the computed distances to establish a sum, and (c) using a sigmoid function to translate the established sum to a probability value representing the likelihood.

In addition, in line with the discussion above, the act of identifying of the rendered media content as being the first channel of media content could be done using a first fingerprint comparison interval, and the act of comparing the one or more of the received query fingerprints to a corresponding one or more reference fingerprints representing the first channel of media content could be done using a second fingerprint interval shorter than the first fingerprint interval, to help ensure timely detecting of a channel change.

Figure 7:
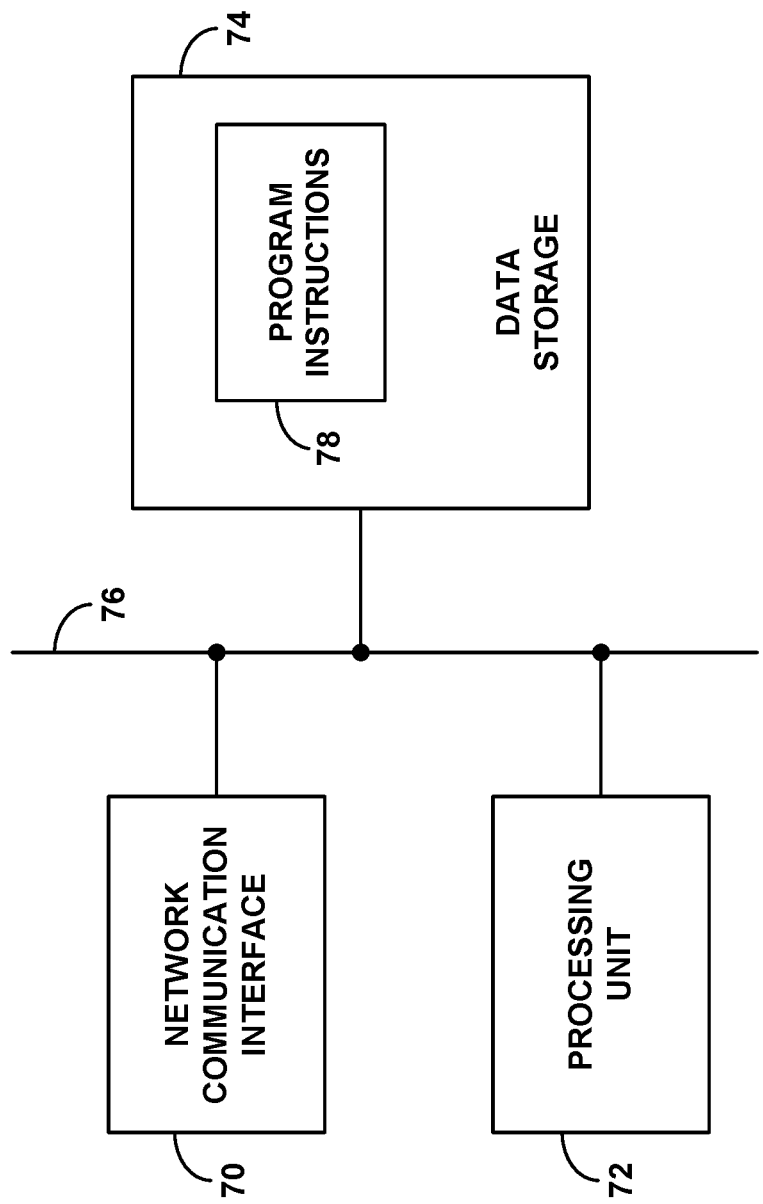
FIG. 7 is a simplified block diagram of an example network server.

FIG. 7 is next a simplified block diagram of an example system operable in accordance with the present disclosure. This system could represent a network server as described above, and/or one or more other entities (possibly including the media presentation device). As shown in FIG. 7, the example system includes a network communication interface 70, a processing unit 72, and non-transitory data storage 74, any or all of which could be integrated together or, as shown, communicatively linked together by a system bus, network, or other connection mechanism 76.

Network communication interface 70 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 72, could then comprise one or more general purpose processors (e.g., microprocessors) and/or one or more specialized processors (e.g., application specific integrated circuits). And non-transitory data storage 74 could comprise one or more volatile and/or non-volatile storage components, such as optical, magnetic, or flash storage.

As shown, data storage 74 then stores program instructions 78, which could be executable by processing unit 72 to carry out various operations described herein. For example, the program instructions could be executable to receive from a media presentation device, via the network communication interface, a query fingerprint stream representing media content being presented by the media presentation device, where the query fingerprint stream has been determined to represent a first channel. Further, the instructions could be executable to detect a threshold mismatch between the received query fingerprint stream and a reference fingerprint stream representing the first channel, where the threshold mismatch indicates a likelihood that the media presentation device has transitioned from presenting the first channel to presenting a second channel. And the instructions could be executable to respond to detecting the threshold mismatch by changing an overlay on the presented media content, including removing superimposed content associated with the first channel for instance.

Other features discussed above can be applied in the context of this system as well, and vice versa.

Figure 8:
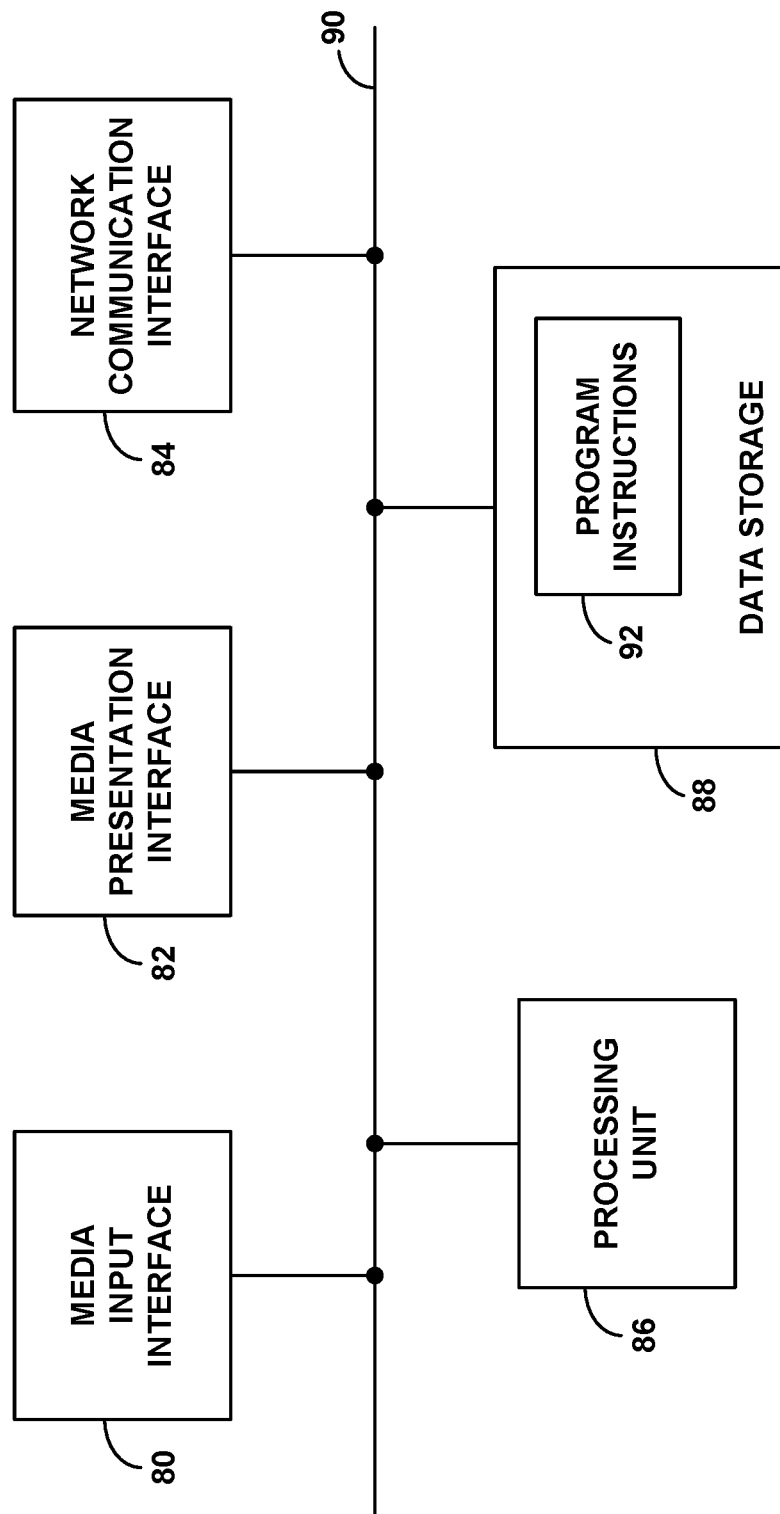
FIG. 8 is a simplified block diagram of an example media presentation device.

Finally, FIG. 8 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 8, the example media presentation device includes a media input interface 80, a media presentation interface 82, a network communication interface 84, a processing unit 86, and non-transitory data storage 88, any or all of which could be integrated together or, as shown, communicatively linked together by a system bus, network, or other connection mechanism 90.

Media input interface 80 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 82 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 84 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 86 could then comprise one or more general purpose processors (e.g., microprocessors) and/or one or more specialized processors (e.g., application specific integrated circuits). And non-transitory data storage 88 could comprise one or more volatile and/or non-volatile storage components, such as optical, magnetic, or flash storage. Further, as shown, data storage 88 stores program instructions 92, which could be executable by processing unit 86 to carry out various operations described here. For example, the program instructions could be executable to generate on an ongoing basis a fingerprint of media content being rendered by the media presentation device, based on analysis of the media content being received at the media input interface 80 and/or being processed at the media presentation interface 82, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A non-transitory computer readable medium having stored thereon instructions executable by a processing unit to detect and respond to a change of channels at a media presentation device, the operations comprising:

while the media presentation device is presenting a first channel, detecting a threshold mismatch between (i) a query fingerprint stream representing media content being presented by the media presentation device and (ii) a reference fingerprint stream representing media content of the first channel, wherein the media presentation device was determined to be presenting the first channel by comparing the query fingerprint stream with the reference fingerprint stream using a first fingerprint comparison rate and, based on the comparing, detecting a match between the query fingerprint stream and the reference fingerprint stream, wherein detecting the threshold mismatch is done by comparing the query fingerprint stream with the reference fingerprint stream using a second fingerprint comparison rate greater than the first fingerprint comparison rate, and wherein the threshold mismatch indicates a likelihood that the media presentation device has transitioned from presenting the first channel to presenting a second channel; and responsive to detecting the threshold mismatch, causing a change of an overlay on the presented media content, wherein the change of the overlay involves removing of superimposed content associated with the first channel.

2. The non-transitory computer readable medium of claim 1, wherein the superimposed content comprises an identification of the first channel.

3. The non-transitory computer readable medium of claim 1, wherein the operations further comprise:

responsive to detecting the threshold mismatch, identifying the second channel, wherein causing a change of an overlay is further responsive to the identifying of the second channel, and the change of the overlay involves adding superimposed content associated with the identified second channel.

4. The non-transitory computer readable medium of claim 3, wherein identifying the second channel comprises comparing the query fingerprint stream with reference fingerprint streams respectively representing a plurality of channels, and determining based on the comparing that the query fingerprint stream matches a reference fingerprint stream representing the second channel.

5. The non-transitory computer readable medium of claim 1, wherein the media content comprises video content, and wherein the overlay comprises a graphical overlay.

6. The non-transitory computer readable medium of claim 1, wherein the media presentation device comprises a television.

7. A non-transitory computer readable medium having stored thereon instructions executable by a processing unit to detect and respond to a change of channels, the operations comprising:

receiving from a media presentation device a query fingerprint stream representing media content being presented by the media presentation device, wherein the query fingerprint stream has been determined to represent a first channel, wherein determining that the query fingerprint stream represents the first channel is done using a first fingerprint comparison rate;

detecting a threshold mismatch between the received query fingerprint stream and a reference fingerprint stream representing the first channel, wherein detecting the threshold mismatch is done using a second fingerprint comparison rate greater than the first fingerprint comparison rate, and wherein the threshold mismatch indicates a likelihood that the media presentation device is no longer presenting the first channel, and responsive to detecting the threshold mismatch, causing a change of an overlay on the presented media content, wherein the change of the overlay involves removing superimposed content associated with the first channel.

8. The non-transitory computer readable medium of claim 7, wherein the operations further comprise:

responsive to detecting the threshold mismatch, identifying a second channel being presented by the media presentation device.

9. The non-transitory computer readable medium of claim 8, wherein causing a change of an overlay is further responsive to the identifying of the second channel, and the change of the overlay involves adding superimposed content associated with the identified second channel.

10. The non-transitory computer readable medium of claim 9, wherein identifying the second channel comprises comparing the query fingerprint stream with reference fingerprint streams respectively representing a plurality of channels, and determining based on the comparing that the query fingerprint stream matches a reference fingerprint stream representing the second channel.

11. The non-transitory computer readable medium of claim 7, wherein the superimposed content comprises an identification of the first channel.

12. The non-transitory computer readable medium of claim 7, wherein the media content comprises video content, and wherein the overlay comprises a graphical overlay.

13. The non-transitory computer readable medium of claim 7, wherein the media presentation device comprises a television.

14. A non-transitory computer readable medium having stored thereon instructions executable by a processing unit to detect and respond to a change of channels, the operations comprising:

while the media presentation device is presenting media content determined to be of a first channel, detecting a threshold mismatch between (i) a query fingerprint stream representing the media content being presented by the media presentation device and (ii) a reference fingerprint stream representing the first channel, wherein determining that the query fingerprint stream represents the first channel is done using a first fingerprint comparison time interval, wherein detecting the threshold mismatch is done using a second fingerprint comparison time interval shorter than the first fingerprint comparison time interval, and wherein the threshold mismatch indicates a likelihood that the media presentation device has transitioned from presenting the first channel to presenting a second channel;

responsive to detecting the threshold mismatch, causing a change of an overlay on the presented media content, wherein the change of the overlay involves removing superimposed content associated with the first channel.

15. The non-transitory computer readable medium of claim 14, wherein the superimposed content comprises an identification of the first channel.

16. The non-transitory computer readable medium of claim 15, wherein the operations further comprise:

responsive to detecting the threshold mismatch, identifying the second channel, wherein causing the change of the overlay is further responsive to the identifying of the second channel, and the change of the overlay involves adding superimposed content associated with the identified second channel.

17. The non-transitory computer readable medium of claim 16, wherein identifying the second channel comprises comparing the query fingerprint stream with reference fingerprint streams respectively representing a plurality of channels, and determining based on the comparing that the query fingerprint stream matches a reference fingerprint stream representing the second channel.

18. The non-transitory computer readable medium of claim 13, wherein the media content comprises video content, and wherein the overlay comprises a graphical overlay.

19. The non-transitory computer readable medium of claim 13, wherein the media presentation device comprises a television.

* * * * *